May 26, 1959

K. A. LAYTON 2,888,673

ANTENNA RADIATION PATTERN ANALYZER

Filed Sept. 16, 1957

INVENTOR.
KENNETH A. LAYTON
BY George Sipkin
George E. Pearson
ATTORNEYS

May 26, 1959  K. A. LAYTON  2,888,673
ANTENNA RADIATION PATTERN ANALYZER
Filed Sept. 16, 1957  3 Sheets-Sheet 3

INVENTOR.
KENNETH A. LAYTON
BY George Sipkin
George E. Pearson
ATTORNEYS

United States Patent Office 2,888,673
Patented May 26, 1959

2,888,673

ANTENNA RADIATION PATTERN ANALYZER

Kenneth A. Layton, La Mesa, Calif., assignor to the United States of America as represented by the Secretary of the Navy Application September 16, 1957, Serial No. 684,381

2 Claims. (Cl. 340—347)

(Granted under Title 35, U.S. Code (1952), sec. 266)

The invention described herein may be manufactured and used by or for the Government of the United States of America for governmental purposes without the payment of any royalties thereon or therefor.

This invention relates to an analyzer for obtaining data from various types of charts for evaluation purposes and more particularly to an antenna radiation pattern analyzer for converting information from polar recordings into punched-tape digital form.

The use of antenna radiation patterns is an important factor in the development and evaluation of shipboard radio communication systems. Techniques using scale ship models have been developed that permit the patterns to be recorded quickly, accurately, and economically. Several thousand antenna patterns may be recorded in studies applying to one class of ship and each pattern must be analyzed to obtain the necessary evaluation data or system design.

Statistical methods are convenient for comparison of the performances of either individual or groups of antenna patterns. The irregular shape of each pattern can be represented by two values, the mean value and the standard deviation. These values can be calculated from sufficient samples of the pattern magnitude. The calculations are simplified if the samples are taken in equal angular increments. Under these conditions $$\text{Mean value} = \frac{\Sigma R}{n}$$

And the standard deviation $= \sigma = \sqrt{\frac{\Sigma R^2}{n} - \left(\frac{\Sigma R}{n}\right)^2}$ where $R=$ pattern magnitude and $n=$ number of samples. Analysis has shown that 36 samples are sufficient to provide accurate information about the mean value and standard deviation for shipboard antenna patterns.

The engineering effort required to reduce polar patterns manually to digital data and to perform the required calculations is tedious and time consuming.

In accordance with the present invention there is provided a pattern analyzer which simplifies and greatly reduces the time element normally required by the manual reduction of data and calculations aforedescribed. This analyzer automatically scans recorded polar patterns in small angular increments of the order of 10 degree steps as a fast rate, and, to the nearest digit, records the amplitude variations in digital form on a perforated tape.

It is therefore an object of the present invention to simplify the procedure involved in obtaining information from antenna radiation patterns for evaluation purposes.

Another object is to provide a new and improved pattern analyzer which can be used for such a purpose.

Another object of this invention is to provide a device which will accurately and quickly convert information from polar patterns into a usable form for computers.

Another object is to provide a device of this type which can automatically convert amplitude variations of an antenna radiation pattern into punched-tape digital form.

Another object resides in the provision of a pattern analyzer for automatically scanning polar antenna radiation patterns and recording the amplitude variations appearing thereon in digital form on a perforated tape.

Other objects and many of the attendant advantages of this invention will be readily appreciated as the same becomes better understood by reference to the following detailed description when considered in connection with the accompanying drawings wherein.

Figure 1:
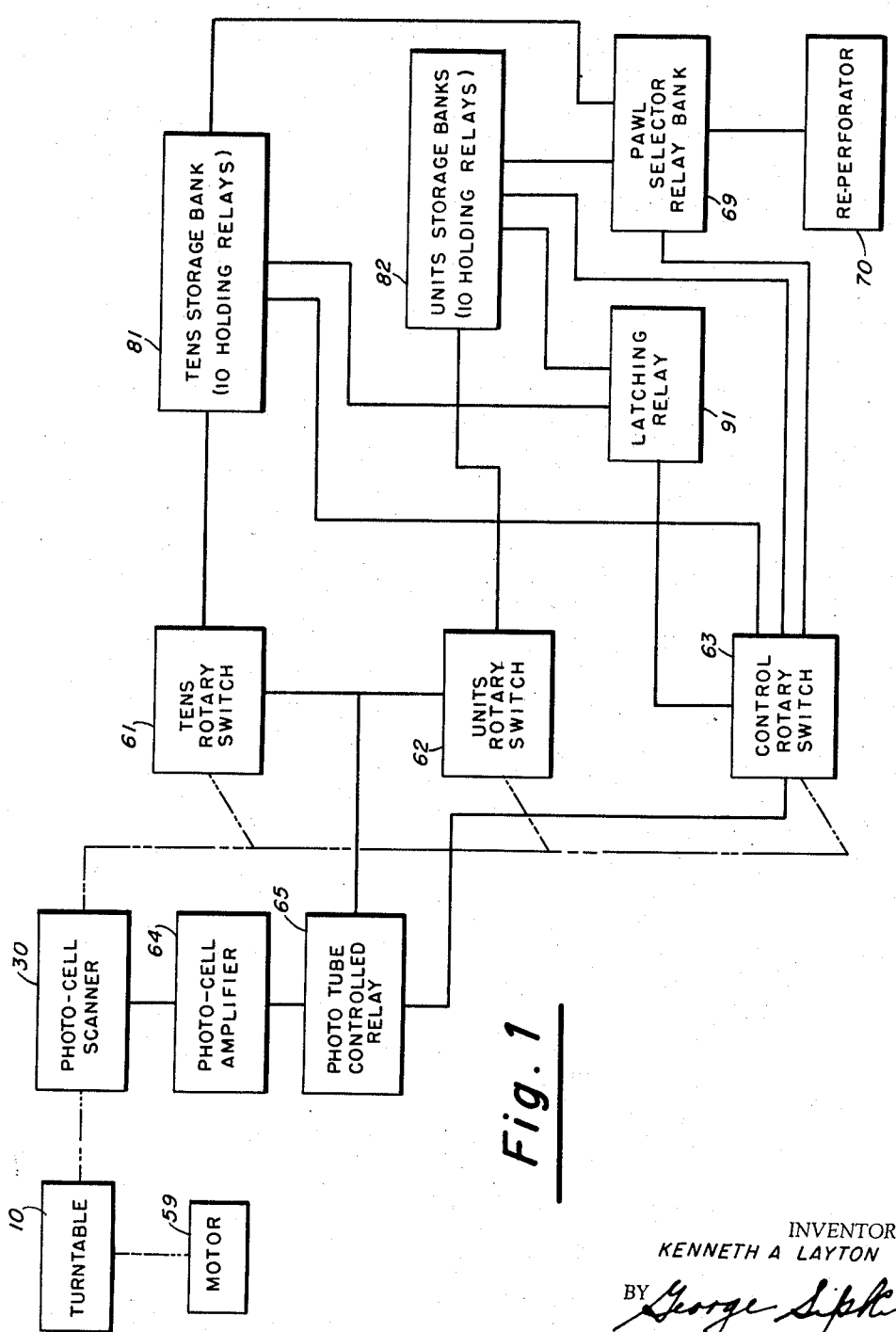
Fig. 1 is a block diagram of the complete polar analyzer system and indicates the basic operating principles thereof.

Referring now to the drawings wherein like reference characters designate like or similar parts throughout the several views, there is shown in Fig. 1 a photo-cell scanner 30 which is moved linearly over a polar chart having an antenna radiation pattern recorded thereon. The chart is supported on a turntable 10 which is driven by a motor 59. The scanner and turntable movements are synchronized, as indicated by the interconnecting dashed lines, with the rotation of three rotary switches 61, 62, and 63, also designated tens rotary switch, units rotary switch, and control rotary switch. The tens and units switches are employed to control the storing of data relating to the amplitude of the recorded pattern. For this purpose, each of these switches has ten contacts connected respectively to ten holding relays, thus providing two banks of relays designated tens storage bank 81 and units storage bank 82. Numbers 00 to 99 can be stored by selectively closing one relay in each of the banks of relays.

An impulse is obtained from the photo-cell scanner 30 whenever it crosses the recorded line on the polar chart. It is then passed on to the photo-cell amplifier 64 which operates the photo-cell controlled relay 65. Relay 65 then selectively operates the tens and units switches 61 and 62 closing one of the 10 holding relays in the tens and units storage banks 81 and 82 respectively. Otherwise stated, as the impulse is obtained from the photo-cell, each rotating switch closes one of the holding relays in its bank of storage relays. Because of the synchronization between the movement of the photo-cell scanner and that of the rotating switches, these relays correspond to the amplitude of the recorded pattern. This information is held in the storage banks until the photo-cell scanner has completed its scan. Control switch 63 then examines the two banks through latching relay 91 to ensure that the relays have functioned properly. If so, the rotary switch 63 then connects the closed relays to the pawl selector relay bank 69 which, in turn, operates the tape reperforator 70 which may be of any type suitable for the purpose such as a Western Union, Type 10-B-Teletype. After the two digits have been punched on the tape, this switch resets all relays for the next scan.

Mechanical system

Figure 2:
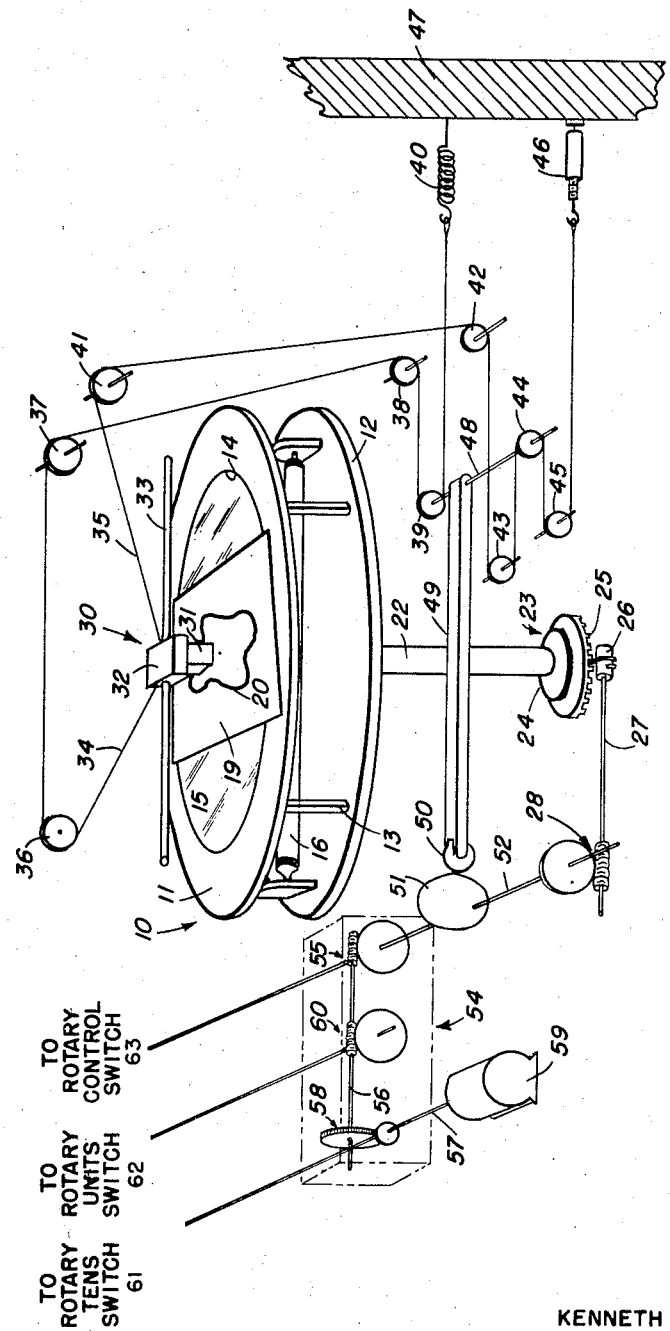
Fig. 2 is a pictorial schematic of the mechanical features.

The mechanical features of this invention are shown in Fig. 2 wherein it may be seen that such as the turntable 10 has an upper disc 11 mounted on a lower disc 12 by means of supports 13. The upper disc 11 has a central opening 14 closed by opaque glass 15 and a light 16 is disposed below. A chart or graph 19 having a recorded pattern 20 is placed over the glass 15 and held in place by any convenient means such as, for example, by magnets. The lower disc 12 is mounted on a shaft 22 rotated by means of a stepping gear arrangement 23 having a pin gear 24 with thirty-six pins 25. The lead of the worm gear 26 is one-thirty-sixth the circumference of the pin gear 24 advancing the turntable every 10°. Worm gear 26 is secured to shaft 27 turned by a gear arrangement 28. The photo-cell scanner assembly 30 supporting a tube-holder 31 is mounted on a slide support 32 which moves along a rod 33. Cables 34 and 35 are fastened respectively to opposite sides of slide support 32 and are trained over pulleys 36 to 39 and 41 to 45. Cable 34 passes around pulleys 36–39 and is fixed to an anchor spring 40 secured to a fixed member 47. Cable 35 is trained around pulleys 41–45 and fastened to an adjustable hook 46 also secured to member 47. Pulleys 39 and 44 are mounted on a common shaft 48 which in turn is carried by a push-rod 49 which carries a cam follower wheel 50. The associated cam 51 is secured to a shaft 52 which is driven through a gear arrangement 55 by shaft 56 coupled to shaft 57 through gear arrangements 58 driven by motor 59. Gear arrangements 58, 60, and housed in a gear box 54 operate rotary switches 61, 62, and 63 respectively. Rotary switch 63 is mounted on the same shaft 52 as the cam 51.

*Electrical system*

Figure 3:
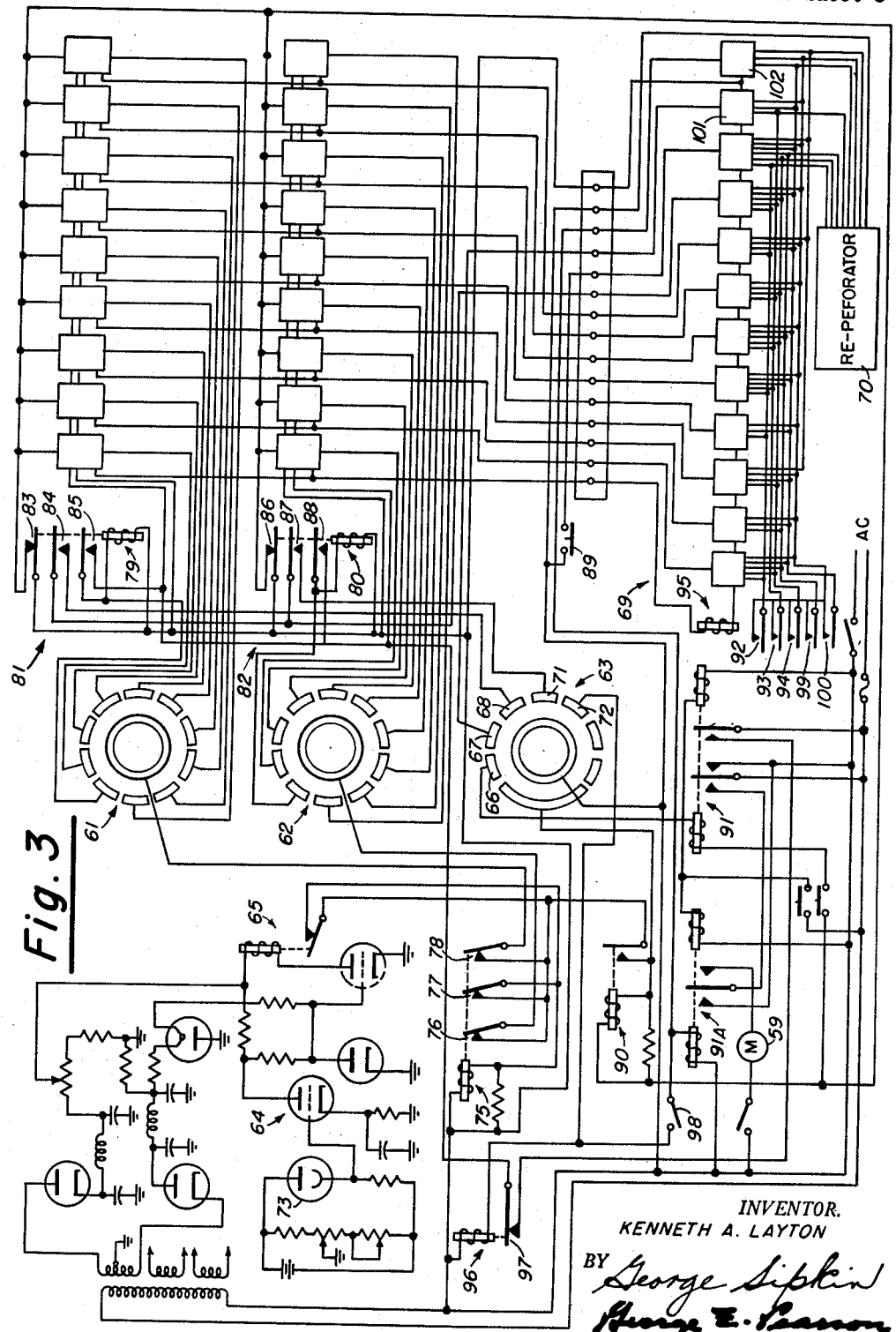
Fig. 3 is a schematic diagram of the electrical system.

Referring now to Fig. 3 for a better understanding of the electrical system, as shown in the block diagram, when the photo-cell tube 73 contained within the tube holder 31 shown in Fig. 2 passes over the recorded pattern 20 on the polar chart 19, a pulse is obtained. The pulse is then amplified by photo tube amplifier 64 in order to operate relay 65, which momentarily closes and energizes relay 75. Relay 75 closes and is held closed by its holding contact 77. Contacts 76 and 78 of relay 75 furnish voltage to one of the storage relays 79 and 80 of the tens and units storage bank 81 and 82 respectively through the tens and units rotary switches 61 and 62. The storage banks 81 and 82 have ten relays, however one one in each bank is shown in detail. The relays 79 and 80 selected depend upon the position of the rotary switches 61 and 62 which are synchronized with the photo-cell scanner 30. When the storage relays 79 and 80 close, they are held closed by their holding contacts 85 and 88 respectively. The contacts 83 and 86 which have been supplying voltage to relay 90 through control switch 63 open, relay 90 is then de-energized which removes the holding voltages from relay 75 and all voltages except the holding voltage from the storage relays 79 and 80. This prevents any transients caused by relay 65 which closes on the retrace portion of the photo-cell scanner 30, from activating the relays 79 and 80.

Each of the storage relays 79 and 80 is energized through contacts 83 and 86 of the preceding storage relay respectively. With this arrangement, it is not possible for more than one relay to close and hold in each storage bank.

When the photo-cell scanner 30 has completed its scan, the storage relays 79 and 80 are examined to ensure that one relay has closed in each bank. Control switch 63 tries to energize the coil of the latching relay 91 through contact 66 of the control switch 63 and contacts 83 and 86, of the storage relays 79 and 80 respectively. If the photo-cell tube 73 has failed to provide an impulse during its scan, the circuit will be completed through contacts 83 and 86 of the storage relays 79 and 80. Relay 91 will then be energized and the drive motor 59 will stop. Simultaneously contacts 85 and 88 remove the holding voltage from the storage relay 79 and 80. If this happens, the proper digit can be manually punched on the tape by push button switches 89 of which only one is shown. Normally one relay in each storage bank 81 and 82 will be closed and relay 91 will not be energized. Control switch 63 is now ready to read out the stored digital information and to operate the tape reperforator 70. The tape reperforator 70 can be magnetically operated having five punches controlled by five magnetical pawls. In order to punch the digits 0 to 9, various combinations of the five punches are used in a standard teletype code. The contacts 92, 93, 94, 99 and 100 of relay 95 are arranged to operate the pawls to punch digits 0 to 9, figure, space, and carriage return. These digits and symbols are used in programming the IBM computer. Contact 67 of control switch 63 energizes the relay 101 shown in a block form which causes the tape reperforator to punch a space mark on the teletype.

The pawl selector relays 69 are energized through contacts 84 and 87 of the storage relays 79 and 80 and control switch 63. Each of the pawl selector relays 69 is connected directly to one of the contacts 84 and 87 of corresponding digit in both the tens 81 and units 82 storage banks. The common side of contact 84 of the tens storage relays 79 is connected to contact 68 of the control switch 63. The common side of contact 87 of the units relays 82 is connected to contact 71 of control switch 63. When control switch 63 rotates to contact 68, the pawl selector relay 69 which is connected to the closed relay in the tens storage bank 81 is energized. Similarly, when the control switch 63 rotates to contact 71, the pawl selector relay 69 which is connected to the closed relay in the units storage bank 82 is energized. In this way, two digits are punched on the teletype tape corresponding to the amplitude of the recorded pattern 20. Contact 72 of control switch 63 energizes storage reset relay 96 whose normally closed contacts 97 furnish holding voltage to the storage relays 79 and 80. When these contacts open, the storage relays 79 and 80 are all de-energized in preparation for the next cycle of operation. Microswitch 98 is mechanically closed during the thirty-six and final retrace of the photo-cell scanner 30. When switch 98 closes and control switch 63 is on contact 72, relays 91A, 96 and 102 (102 shown in block form operates the carriage return) are energized.

Obviously many modifications and variations of the present invention are possible in the light of the above teachings. It is therefore to be understood that within the scope of the appended claims the invention may be practiced otherwise than as specifically described.

What is claimed is:

1. An analyzer comprising a turntable provided with a plane surface for supporting a chart, a polar chart of an antenna radiation pattern mounted on said turntable, a stepping gear drive for intermittingly rotating said turntable in equal angular increments, a scanner including a differential pulley drive for moving the same in a linear direction across said turntable in synchronism with the incremental rotation thereof, means including a photo-cell in said scanner for generating a pulse each time the scanner crosses over a recorded line on said chart during each complete linear traverse at said angular increments, means including a tape for recording digital data, and means responsive to said pulses for perforating said tape in digital form corresponding to the amplitude of said pattern at said crossover.

2. An analyzer as set forth in claim 1 wherein said means responsive to said pulses comprising three rotary switches mechanically driven and synchronized with the said turntable rotation, said switches including a tens switch, a units switch and a control switch respectively, holding relays for storing data from the tens and units switches corresponding to the amplitude pulse of the recorded pattern, and a pawl selector relay bank in combination with a latching relay operated by said control switch for operating a tape reperforator.

References Cited in the file of this patent

UNITED STATES PATENTS

| | | |
|---|---|---|
| 2,597,866 | Gridley | May 27, 1952 |
| 2,714,204 | Lippel et al. | July 26, 1955 |
| 2,826,252 | Dickstein | Mar. 11, 1958 |